United States Patent [19]

Fink

[11] Patent Number: 4,728,217

[45] Date of Patent: Mar. 1, 1988

[54] GRIPPER APPARATUS AND METHOD

[75] Inventor: David J. Fink, Pittsburgh, Pa.

[73] Assignee: Westinghouse Electric Corp., Pittsburgh, Pa.

[21] Appl. No.: 832,940

[22] Filed: Feb. 26, 1986

[51] Int. Cl.⁴ .......................... B23Q 3/00; B66C 1/24; F16B 2/14

[52] U.S. Cl. ...................................... 403/290; 403/31; 403/297; 294/86.4; 294/86.24; 294/906; 294/96; 376/260; 269/48.1; 29/252

[58] Field of Search ................. 403/290, 31, 248, 292, 403/297; 294/86.4, 86.24, 86.25, 906; 376/260, 271; 294/96; 269/48.1; 29/252

[56] References Cited

U.S. PATENT DOCUMENTS

| 1,920,103 | 7/1933 | Otis | 294/96 |
|---|---|---|---|
| 2,243,419 | 5/1941 | Festervan et al. | 294/86.24 |
| 2,496,360 | 2/1950 | Stone | 294/96 |
| 3,266,835 | 8/1966 | Hall et al. | 294/86.24 |
| 3,574,381 | 4/1971 | Ocheltree | |
| 3,698,756 | 10/1972 | Groves | 294/96 |
| 3,791,011 | 2/1974 | Keys | 29/252 |
| 4,147,312 | 4/1979 | Secor et al. | |
| 4,158,415 | 6/1979 | Young | 294/96 |
| 4,236,967 | 12/1980 | Batjukov et al. | 376/271 |
| 4,276,806 | 7/1981 | Morel | |
| 4,400,122 | 8/1983 | Minnaar et al. | |
| 4,427,317 | 1/1984 | Wilhelm | 403/31 |

FOREIGN PATENT DOCUMENTS

0798019 1/1981 U.S.S.R. ................. 294/96

Primary Examiner—Cornelius J. Husar
Assistant Examiner—Todd G. Williams

[57] ABSTRACT

A gripper with leaf springs having fingers near their ends to engage and disengage work. The springs are respectively connected in an annular array to the end of a cylindrical support. The springs are diverged or expanded to cause the fingers to engage the work and are converged or collapsed to cause the fingers to disengage the work. During the diverging and the converging each spring is pivoted about its junction with the support. The diverging and the converging of the springs is effected by an actuator or mandrel including a rod having a nose at its outer end. The actuator is reciprocable within the springs between advanced and retracted positions. Near its outer end the rod has a conical cam surface which engages cooperative internal cam-follower surfaces on the springs to diverge the springs when the actuator is in advanced position. The nose has a skirt which engages the outer ends of the springs, i.e. the fingers, to converge the springs near the ends when the actuator is in retracted position. The joint between each spring and the support is flexed radially outwardly from an unstressed neutral position to diverge the springs and radially inwardly from the neutral position to converge the springs. The range of the flexing in each direction is within the elastic limit of the material of the joint. Thus the leaf springs remain resilient and fatigue as a result of repeated flexing of the joints is precluded.

12 Claims, 20 Drawing Figures

GRIPPER APPARATUS AND METHOD

CROSS-REFERENCE TO RELATED APPLICATION

Application Ser. No. 785,291 filed Oct. 7, 1985 to Arzenti et al for *Sleeving of Steam Generators* (herein Arzenti) assigned to Westinghouse Electric Corporation is incorporated herein by reference.

BACKGROUND OF THE INVENTION

This invention relates to gripper apparatus for engaging work pieces for processing. The principles of this invention are applicable to the gripping of work pieces of many types either internally or externally. But in particular this invention is uniquely suitable for the suspension of tools from the tube sheet of a steam generator, which is to be sleeved, by gripping of neighboring tubes internally as described in Arzenti. In the interest of relying on a concrete embodiment in the explanation of this invention, this invention is described as applied to the suspension of tools from the tube sheet of a steam generator. To the extent that this invention is applied to the processing of work pieces of other types than tube sheets, whether the work pieces is gripped internally or externally, such application is within the scope of equivalents of this invention.

The tubes of a steam generator which carry the hot fluid whose energy (enthalpy) is converted into steam by heat exchange are sealed through the tube sheet. In case of a steam generator of a nuclear reactor plant, these tubes carry the coolant heated by the core of the reactor. A channel head extends downwardly from the periphery of the tube sheet. The hot fluid enters an inlet section of the channel head, is conducted through the tubes to an outlet section and out of the outlet section. In case of a steam generator of a nuclear reactor plant, the coolant is radioactive and the channel head is radioactive.

It has been found that the tubes of a steam generator which conduct the coolant become corroded or damaged in other ways and must be sleeved. The sleeving is effected by a succession of tools which are suspended from the tube sheet. Since the reactive forces generated by the tools in performing their functions are high, the tools must be firmly and reliably suspended from the tube sheets. This is a particularly urgent requirement in the case of a steam generator of nuclear-reactor plants where the tube sheet and the channel head are radioactive.

It is an object of this invention to provide gripper apparatus for firmly and reliably suspending such tools.

The suspension of the tools is effected, separately for each tube to be sleeved, by gripper apparatus provided on the mountings of the tools. The gripper apparatus has gripper means which penetrates into tubes adjacent to a tube to be sleeved and firmly grips these neighboring tubes. Such gripper apparatus is sometimes referred to as a camlock. The neighboring tubes include intact tubes which require no sleeving, corroded or damaged tubes which may later require sleeving and sleeved tubes. The inside diameter of a sleeved tube is substantially smaller than the inside diameter of an unsleeved tube. It is accordingly necessary that the gripper means of the gripper apparatus be operable over a substantial range so that it may grip reliably both sleeved and unsleeved tubes.

Gripper apparatus in accordance with the teachings of the prior art includes a collet within which there is longitudinally movable mandrel. The collet includes prongs or keys which are held in retracted position by O-rings. When the mandrel is to engage work, the mandrel is retracted expanding the collet to engage the work. One difficulty with this prior art gripper apparatus is that the range of the collet between the open and closed positions is limited. Such gripper apparatus which is suitable for engagement with a sleeved tube cannot serve for engagement with an unsleeved tube and vice versa. It is then necessary to interchange gripper apparatus, in the radioactive environment of the channel head, in dependence upon whether a sleeved tube or an unsleeved tube is to be engaged. In addition one or more of the keys sometimes protrudes and is thrust against the end of the tube when an attempt is made to insert the collet. Also, the O-rings have a limited life.

Typical prior art is also disclosed in Groves U.S. Pat. No. 3,698,756. Groves is complicated in its structure and operation and because of its complexity is unreliable. In Groves a plunger rod urges flexible fingers into engagement with work and a sleeve is slidable by the plunger rod through a pin to disengage the fingers from the work. Misalignment of the pin would cause bending and jam this gripper apparatus.

It is accordingly an object of this invention to provide reliable gripper apparatus of uncomplicated structure and operation having a wide range such that the same unit of apparatus can be used to suspend processing tools both from sleeved tubes and from unsleeved tubes. It is also an object of this invention to provide a method for operating such apparatus.

SUMMARY OF THE INVENTION

In accordance with this invention gripper apparatus is provided whose gripper means is a plurality of leaf springs extending from a cylindrical support. At their axially outer ends the leaf spring have gripper fingers. The leaf springs are arrayed in an annular array with the inner surfaces of the gripper fingers defining a surface whose envelope is a frustum of a cone. Within the array of leaf springs an actuator or mandrel is movable axially between an advanced position and retracted position. The mandrel includes a rod from which a nose extends. Near its axially outer end the rod has a frustoconical tip. The surface of this tip is essentially a cam with which the inner surfaces of the fingers cooperate as cam followers. When the mandrel is in the advanced position the gripper fingers are diverged by the cam surface of the mandrel engaging the inner surface of a tube to which the gripper apparatus is to be secured. During this operation the leaf springs are flexed or deflected radially outwardly. The nose which extends from the tip of the rod has a skirt. In the retracted position of the mandrel this skirt engages the fingers circumferentially converging the fingers about the mandrel. In this operation, the leaf springs are flexed or deflected radially inwardly. The deflection during diverging of the springs is limited by the maximum diameter of the rod and the deflection during the converging is limited by the diameter of a stud extending centrally from the nose.

It is essential that the leaf springs should retain their resilience so that they are effective in supporting the tools. In addition, failure of the leaf springs by reason of metal fatigue from repeated flexing should be precluded. For these reasons the gripper apparatus in accordance with this invention is structured so that during operation, the range over which the leaf springs are flexed is within the elastic limit of the springs; i.e., the proportional range of the stress-strain relationship of the leaf springs. The leaf springs are flexed or deflected radially outwardly and radially inwardly from a neutral stress-free position and the range of the deflection in each direction is maintained within the elastic limit of the material of the springs by appropriate dimensioning of the maximum diameter of the rod of the mandrel and of the diameter of the stud extending from the nose.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

The dimensions shown in FIGS. 4, 6, 8, 10 and 12 are in inches; they are shown only for the parts of the overall structure which are significant to this invention. These dimensions are shown not with any intention of in any way limiting the scope of this invention but for the purpose of aiding those skilled in the art in practicing this invention.

DETAILED DESCRIPTION OF EMBODIMENT

The drawings show gripper apparatus 31 which is suspended from a top plate 32. The gripper is shown positioned to be secured to a tube 33 (FIG. 1) in the tube sheet 35 of a steam generator. Typically this apparatus 31 supports tools (as shown in Arzenti) used in sleeving a damaged tube of the generator. The apparatus 31 and top plate 32 and the tools which it supports are suspended under the tube sheet 35 within the channel head of the generator.

The gripper apparatus 31 (FIG. 1) includes a circularly cylindrical housing 37. The wall of the housing has a longitudinal slot 39 on one side. The top 41 of the housing 39 has a shoulder from which a neck or stem 43 extends. There is a circular hole in the top which is coaxial with the hole in the top plate 32 from which the assembly 31 is suspended. There is a bushing 45 in the hole through the top 41. Lower bearing 47 is interposed between the shoulder and the top plate. A dowel pin 49 through the bearing 47 penetrates into the top 41. There is also an upper floating bearing 51 which is urged outwardly by springs 53. The springs facilitate adjustment of the position of each gripper apparatus 31 permitting restricted lateral movement.

Figure 1:
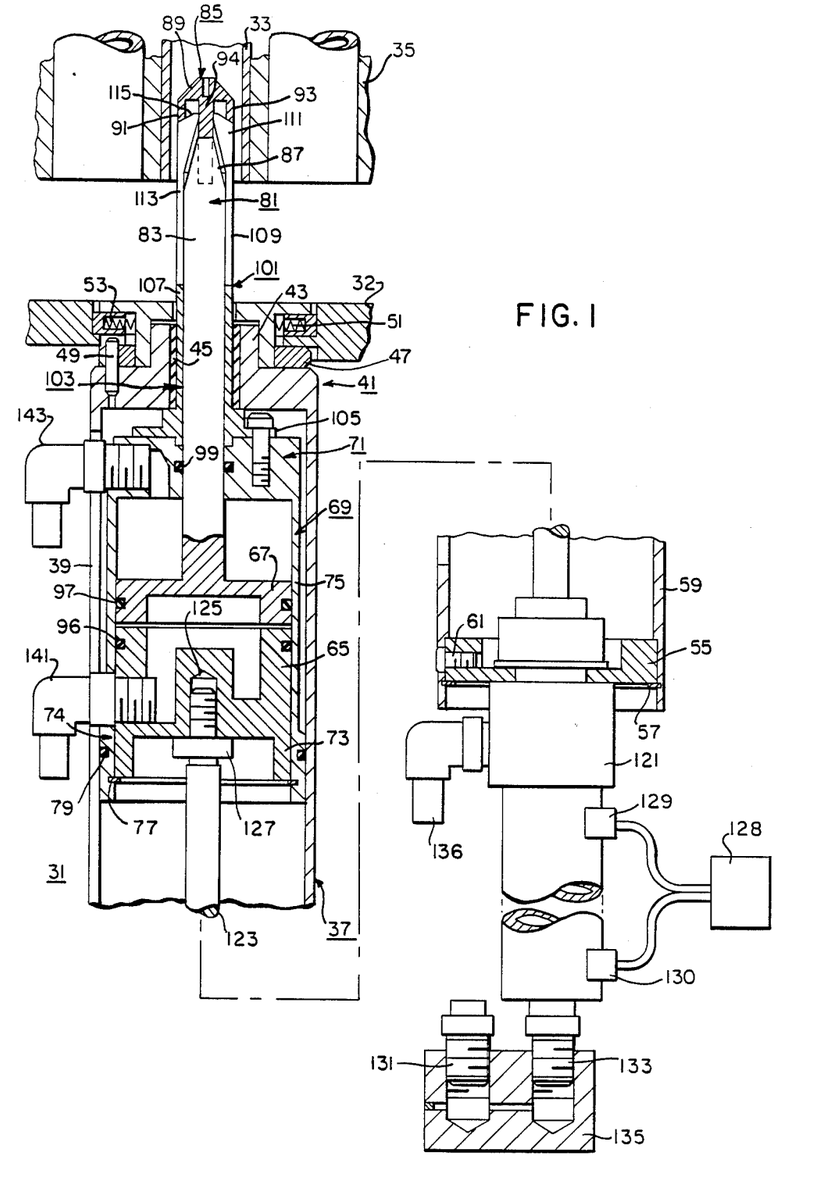
FIG. 1 is a view, partly in side elevation and partly in longitudinal section of gripper apparatus in accordance with this invention.

The housing end cap 55 at the lower end is dish-shaped, is supported on a retainer ring 57 just above the lower rim of the wall 59 of the housing 37 and is secured by a set screw 61. The end cap 55 has a circular hole which is coaxial with the hole in the top 41.

Within the housing 37 there is a composite piston and cylinder assembly including main piston 65 and auxiliary piston 67 and cylinder 69. Cylinder 69 is mounted on main piston 65 and is movable therewith. Auxiliary piston 67 is movable relative to main piston 65 in cylinder 69. Cylinder 69 has a top 71 which has a circular hole coaxial with the hole through the top 41 of the housing 37. The main piston 65 has a shoulder 73 near its lower end which is in engagement with a thickened extension 74 of the wall 75 of cylinder 69 so that the movement upwardly of piston 65 moves cylinder 69 upwardly. The main piston is prevented from falling through housing 37 by a retainer ring 77. A ring bearing 79 is embedded in the thickened extension 74. This bearing 79 engages the wall of housing 37 along which the cylinder 69 slides. O-rings 96 and 97 (FIG. 1) are interposed between the piston 65 and the wall 75 of the cylinder 69 and between the piston 67 and the wall 75.

Figure 7:
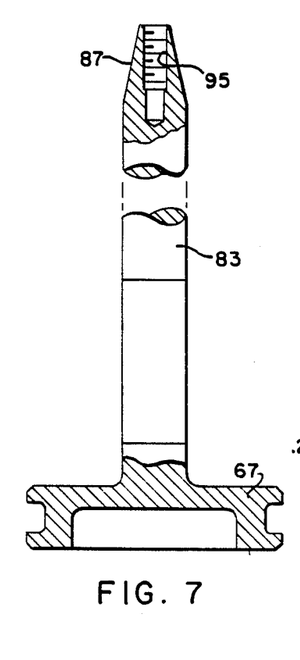
FIG. 7 is a view partly in side elevation and partly in section of the rod of the mandrel of the apparatus shown in FIG. 1.
Figure 8:
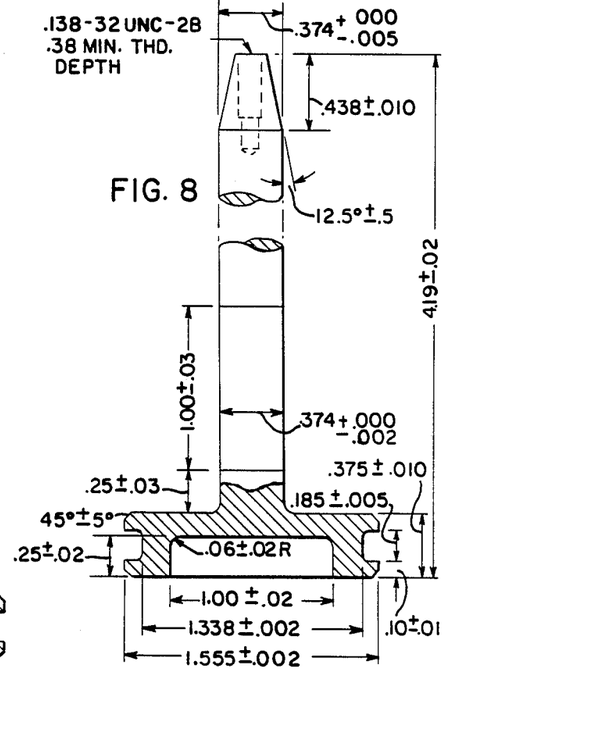
FIG. 8 is a view similar to FIG. 7 but showing typical dimensions of the rod in the practice of this invention.
Figure 9:
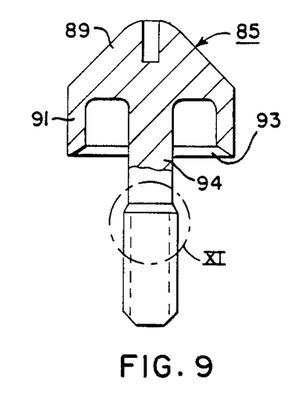
FIG. 9 is a view in longitudinal section of the nose of the mandrel.
Figure 10:
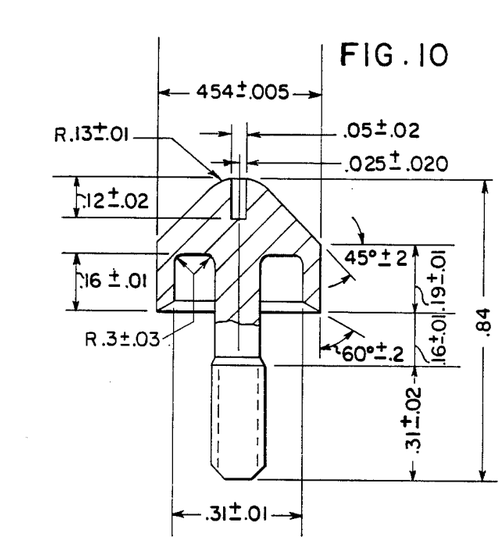
FIG. 10 is a view similar to FIG. 9 but showing typical dimensions of a nose in the practice of this invention.
Figure 11:
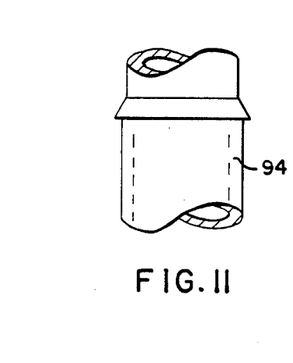
FIG. 11 is an enlarged fragmental view in side elevation of the portion of the nose shown in circle XI of FIG. 9.
Figure 12:
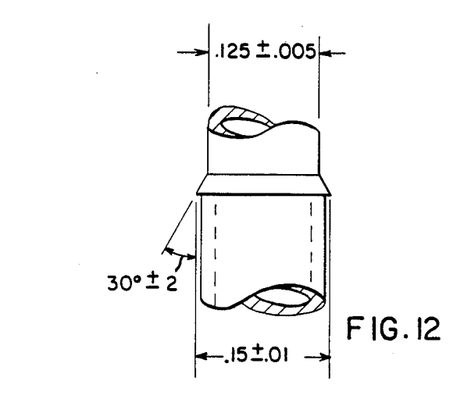
FIG. 12 is a fragmental view similar to FIG. 11 but showing typical dimensions used in the practice of this invention.

An actuator or mandrel 81 extends integrally and centrally, i.e., axially, from piston 67. The actuator 81 is of composite structure including a rod 83 (FIG. 7) and a nose 85 (FIG. 9). The rod 83 is tapered at the top 87 so that the top has the shape of a frustum of a core. The nose 85 has a conical top 89 which merges integrally into a vertical skirt 91. The rim 93 of the skirt 91 is beveled. The nose 85 has an axial threaded stud 94 which is threaded into a tapped hole 95 (FIG. 7) in the top 87 of rod 83. An O-ring 99 (FIG. 1) is interposed and between the rod 83 and the top 71 of the cylinder 69.

Figure 2:
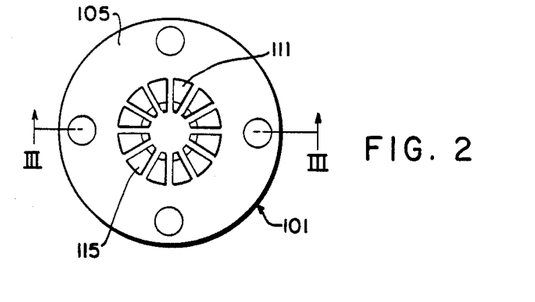
FIG. 2 is a plan view of the leaf-spring assembly of the gripper apparatus shown in FIG. 1.
Figure 3:
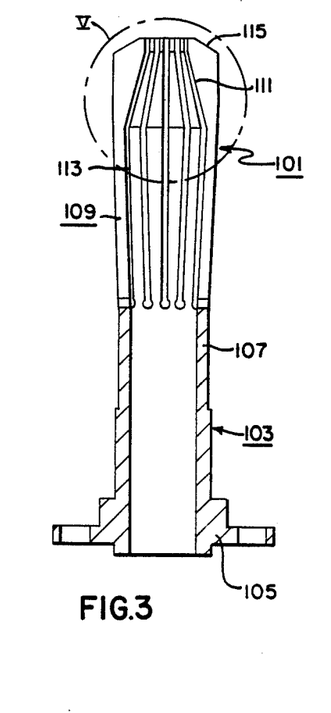
FIG. 3 is a view in section taken along line III—III of FIG. 2.
Figure 4:
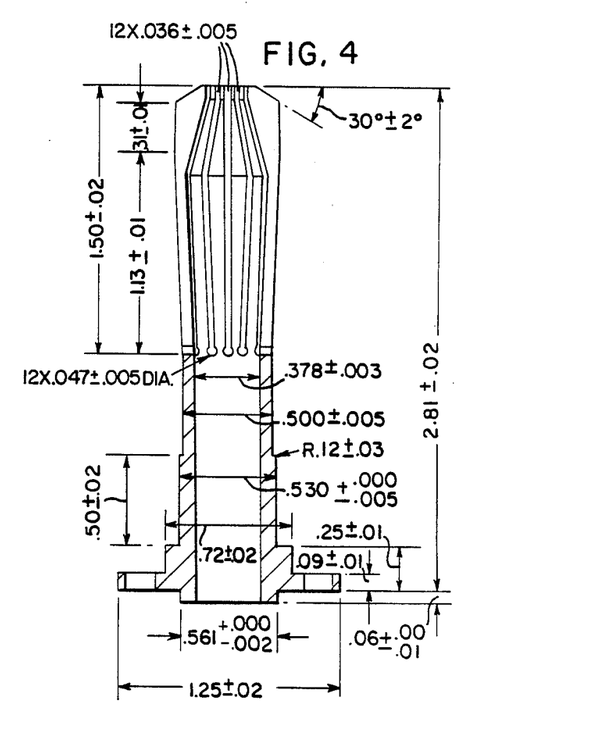
FIG. 4 is a view in section similar to FIG. 3 showing typical dimensions of a leaf-spring assembly of apparatus in accordance with this invention.
Figure 5:
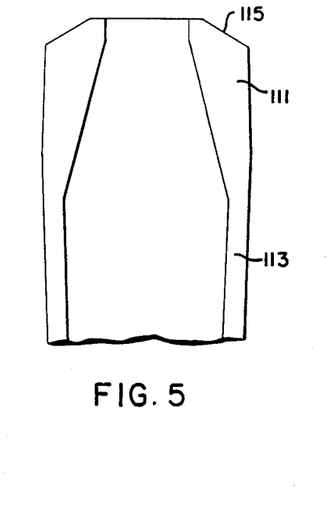
FIG. 5 is a fragmental enlarged view in side elevation of the portion of the leaf-spring assembly in circle V of FIG. 3.
Figure 6:
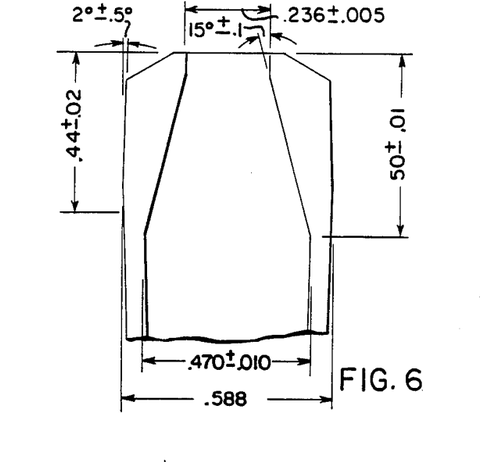
FIG. 6 is an enlarged fragmental view showing typical dimensions of the portion shown in FIG. 5 of a leaf-spring assembly in accordance with this invention.

The gripper apparatus 31 includes gripper means 101 for engaging the tube 33 under pressure to secure a tool to tube sheet 35. The gripper means 101 includes a circularly cylindrical support 103 (FIGS. 1, 2, 3) having an integral flange 105 bolted to the top 71 of cylinder 69. The cylindrical part 107 of the support is slidable in bearing 45. A plurality of leaf springs 109 extend integrally from the upper periphery of the cylindrical part 107. Near the top, or outer end with respect to the part 107, each leaf spring 109 is widened to form a finger 111 (FIGS. 3, 5) which is integrally at an angle to the lower part of the spring. The leaf springs 109 extend contiguously to each other from the support 103 so that at the lower part 113, the inner surfaces of the springs define a surface whose envelope is a cylinder and at the top 111 where the springs are widened, the inner surfaces of the springs define a surface whose envelope is the frustum of a cone. The widened part or finger 111 of each leaf spring 109 is beveled at the top 115 so that the annulus of contiguous leaf springs 109 define a surface at the top whose envelope is the frustum of a cone with a large solid angle. The taper on top 115 of the fingers 111 matches the bevel of the rim 93 of the skirt 91 of the nose 91 of the mandrel 81 (FIG. 9).

Figure 15:
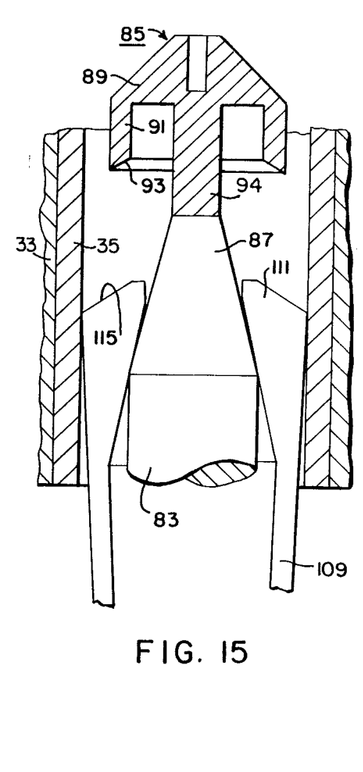
FIG. 15 is a fragmental view similar to FIG. 13 but with the mandrel in the advanced setting so that the leaf springs are diverged.
Figure 16:
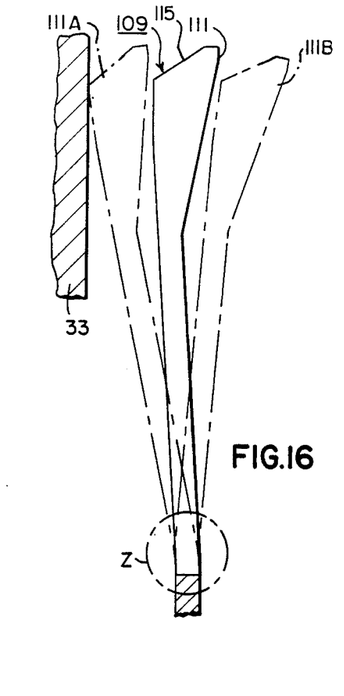
FIG. 16 is a fragmental diagrammatic view showing exaggerated the relationship between the leaf springs of gripper apparatus in accordance with this invention with the leaf springs deflected or flexed from the neutral state to the diverged or expanded state and the converged or collapsed state.
Figure 18:
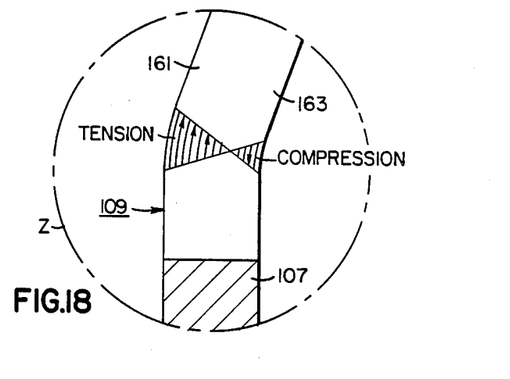
FIG. 18 is a fragmental view enlarged of the part of the leaf springs in circle Z of FIG. 16 showing the stress developed with the leaf springs converged.
Figure 19:
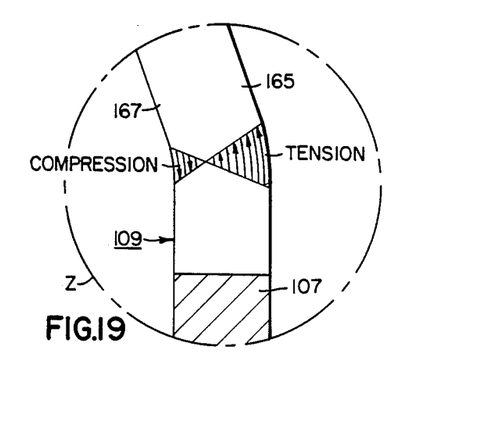
FIG. 19 is a fragmental view enlarged of the part of the leaf springs in circle Z of FIG. 16 showing the stress developed with the leaf springs diverged.

With the mandrel 81 in the advanced position, the conical surface 87 constitutes a cam which engages the internal conical surface defined by the fingers 111 as a cam follower diverging or expanding the leaf springs 109 (FIG. 15) to the position 111A (FIG. 16). In this case the leaf springs are flexed radially outwardly (FIG. 18) about their junctions to the periphery of the support 103. When the mandrel 81 is retracted, the conical surface 87 is disengaged from the fingers 111 and the beveled end 93 of the nose 89 operating as a cam engages the external surface formed by the tapered ends 115 of the fingers 111 and converges or collapses the fingers 111 (FIG. 14) to the position 111B (FIG. 16). The leaves 109 are flexed radially inwardly about their junction with the support 103 (FIG. 19).

The gripper means 101 is typically composed of 17-4 PH stainless steel, heat treated at 900° F. and the nose of 17-4 PH stainless steel heat treated at 1150° F. The rod 83 is typically composed of AISI 455 stainless steel.

The piston assembly 65–67 is driven by a cylinder 121. The piston rod 123 of cylinder 121 has a threaded tip 125 which is threaded centrally into the main cylinder 65 and secured by a nut 127. The upward (with respect to FIG. 1) thrust of the rod 123 advances the piston assembly 65–67 upwardly. The movement of the piston (not shown) in cylinder 121 may be controlled as disclosed in Arzenti through switch 128 and magnetic reed switches 129 and 130.

The cylinder 121 is supplied with compressed air to drive piston rod 123 upwardly. The compressed air is supplied through a connector 131 and a nipple 133 which are interconnected through an adapter 135. Air is supplied to drive piston rod 123 downwardly through elbow fitting 136. When piston rod 123 is driven upwardly, air is exhausted from elbow fitting 136 and when piston rod 123 is driven downwardly, air is exhausted from nipple 133, adapter 135 and connector 131. The piston 67 is movable towards and away from piston 65 into cylinder 69.

Compressed air to drive piston 67 upwardly in cylinder 69 separately from piston 65 is supplied through elbow fitting 141, and, to return piston 67 downwardly, through elbow fitting 143. When piston 67 is driven upwardly, air is exhausted from fitting 143 and when piston 67 is driven downwardly, air is exhausted from fitting 141. The fittings are inserted in housing 37 through slot 39 and are movable upwardly and downwardly in this slot.

Figure 13:
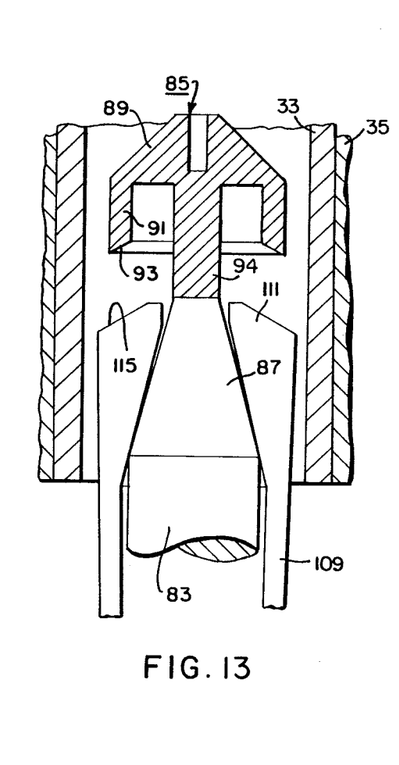
FIG. 13 is a fragmental diagrammatic view showing the leaf springs and mandrel with the mandrel set so that the leaf springs are in neutral position.
Figure 14:
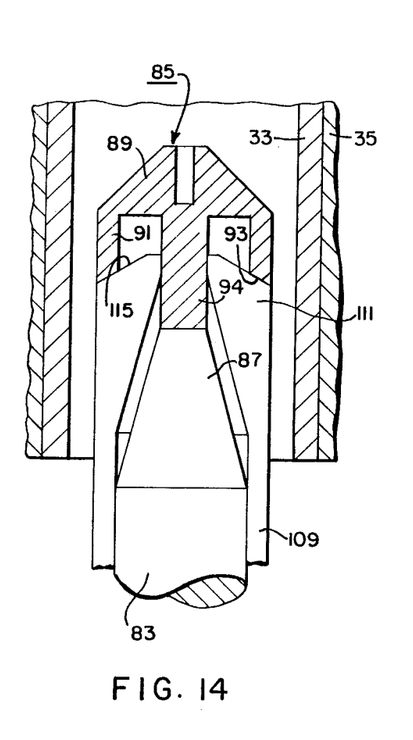
FIG. 14 is a fragmental view similar to FIG. 13 but with the mandrel in the retracted setting so that the leaf springs are fully converged.

Each sleeving tool (not shown) is usually provided with two gripper apparatus units 31 as shown in FIG. 1. The tool is suspended from top plate 32 with a gripper apparatus unit 31 on each side. In use the assembly including the tool and the units 31 is appropriately positioned as taught by Arzenti with the units 31 oriented so that their gripper means 101 may be inserted in tubes 33. Cylinder 121 of each unit is operated to raise piston rod 123, piston 65, piston 67, cylinder 69, mandrel 81 and gripper means 101 so that the fingers 111 of the gripper means are inserted in tube 33. Initially piston 67 is fully retracted so that the fingers 111 are fully collapsed by nose 85 (FIG. 14). Compressed air is now injected in cylinder 69 through elbow 141 driving piston 67 upwardly. Mandrel 81 is raised so that the skirt 91 of nose 85 is disengaged from fingers 111 (FIGS. 13,15). In addition, the conical surface 7 mandrel 81 engages the inner conical surface of the fingers 111, causing the fingers to expand or diverge into contact with the inner surface of tube 33. The gripper apparatus is then locked with the fingers 111 in engagement with tube 33 as shown in FIG. 15 and the tool carries out its operation. When the gripper apparatus 31 is to be disengaged from the tube 33 to remove the tool (not shown), for example, the piston 67 is driven downwardly, retracting rod 81. Nose 85 is moved downwardly, engaging surfaces 115 of the fingers 111, collapsing the fingers as shown in FIG. 14. The gripper apparatus 31 is then in the position shown in FIG. 1.

A significant feature of this invention is that the flexing or deflection of the leaf springs 109 is maintained within the elastic limit of the springs during the converging and diverging of the springs. This aspect of the invention can be explained with reference to the graph in FIG. 20. In this graph, stress, i.e., the load applied to a material, is plotted horizontally and the strain which results from the stress is plotted horizontally. For example, if a bar is stretched by a weight, the tension on the bar per square inch (or other unit area) is the stress and the elongation of the bar is the strain. Likewise when a block is subject to compression the stress is the compression; i.e., weight per square inch, and the strain is the reduction in thickness of the block.

Figure 20:
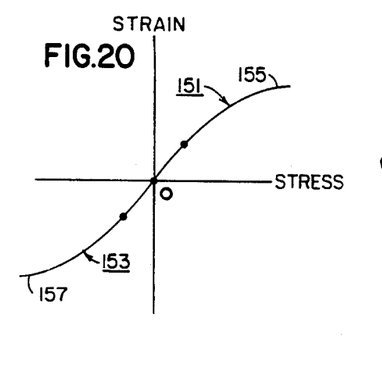
FIG. 20 is a graph showing the stress-strain relationship for a leaf spring which is deflected.

When a bar, for example a beam, is bent under a load, it is deflected. The fibers of the bar remote from the direction in which the load is applied are in tension and are elongated and the fibers nearest the direction of the load are in compression and are contracted. FIG. 20 presents the stress-strain curve for a bar which is so deflected. The origin O of the coordinates represents the unstressed condition of the bar; the portion 151 of the curve in the first quadrant shows the stress-strain relationship when the bar is deflected in one direction and the portion 153 of the curve in the third quadrant shows the stress-strain relationship when the bar is deflected in the opposite direction. It is seen that in each case the curve 151 or 153 is linear up to predetermined stress; i.e., the strain is proportional to the stress. In each case the curve has a knee 155 and 157 for stress higher than this predetermined stress. The material is stressed within the elastic limit in this linear region of the stress-strain curve and is resilient, returning to its initial state O, when the stress is removed. When the stress is so high that the knee 155 or 157 of the curve is reached, the material is beyond its elastic limit and is not resilient; it is essentially plastic.

Figure 17:
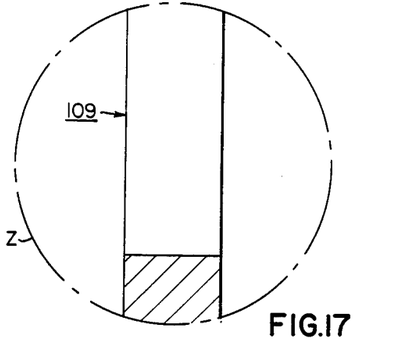
FIG. 17 is a fragmental view enlarged of the part of the leaf-springs in circle Z of FIG. 16 with the leaf springs unstressed.

FIG. 20 is representative of the stress-strain relationship to which the leaf springs 109 are subject in the practice of this invention. This may be understood by reference to FIGS. 16 through 19. In the neutral condition, the springs 109 are not deflected about their junctions to the support 103 and are not stressed as shown in FIG. 17. The condition of the springs is in this case represented by the point O in FIG. 20. When the springs are set in the fully converged position by nose 85, they are deflected radially inwardly. The radially outer fibers 161 (FIG. 18) are under tension and the radially inner fibers 163 are under compression. In the diverged or expanded position, the leaf springs 109 are flexed radially outwardly so that the radially inward fibers 165 (FIG. 19) are in tension and the radially outward fibers 167 are in compression. The non-elastic condition for a metal develops under excessive tension and it is necessary that the deflection of the leaf springs 109 be maintained within the elastic limit with respect to tension.

This object is accomplished in the practice of this invention by proper dimensioning of the maximum diameter of the rod 83 (FIG. 7) of the mandrel 81 and of the diameter of the stud 94 (FIG. 9) extending from the center of nose 85. As shown in FIG. 13, the rod 83 and the nose 85 are not in contact with the leaf springs 109 in the neutral setting of the gripper means 101. In the converged setting of the gripper means, shown in FIG. 14, the skirt 91 of the nose is in engagement with the cam-follower surfaces 115 of the leaf springs 109 but the travel of the leaf springs, radially inwardly, is stopped by the stud 94 so that the straining of the leaf springs is within the elastic limit. FIG. 15 shows the setting of the apparatus with the leaf springs 109 expanded within tube 33. In this case the leaf springs are engaged with the conical end of bar 83 just above the cylindrical part of the bar. The advance of the mandrel 81 is stopped by the pressure exerted by tube 33 through the springs 109 before the fingers 111 engage the bar 83 at its maximum diameter. But even if the advance continued so that the fingers 111 engaged the bar at its maximum diameter, the deflection of the springs 109 would still be within the elastic limit of the metal of the leaf springs.

While a preferred embodiment of this invention has been disclosed herein, many modifications thereof are feasible. This invention is not restricted except insofar as is necessitated by the spirit of the prior art.

I claim:

1. Gripper apparatus for engaging or disengaging work pieces to be processed, said apparatus including hollow gripper means, said gripper means having gripper fingers actuable by diverging to engage said work pieces and actuable by converging to disengage said work pieces said gripper means including a support and resilient connecting means, connecting the fingers to said support, actuating means for said gripper means, advancing-and-retracting means, connected to said actuating means, for advancing said actuating means to an advanced position and for retracting said actuating means to a retracted position, said actuating means including positive diverging means, within said gripper means, to engage said fingers in said advanced position of said actuating means, for flexing said connecting means in one direction about said support from an unflexed condition for positively diverging said fingers to cause said fingers to engage said work pieces and said actuating means also including positive converging means, to engage said fingers directly in said retracted position of said actuating means, for flexing said connecting means in the opposite direction about said support from said unflexed condition for positively converging said fingers to disengage said work pieces, said actuating means including means for limiting the flexing of said connecting means both in said one direction and in said opposite direction so that the range of said flexing in each said direction is within the elastic limit of the material of said connecting means.

2. Gripper apparatus for engaging and disengaging work pieces, said apparatus including a generally cylindrical support, a plurality of leaf springs, each leaf spring being connected to the periphery of said support and defining a junction with said support in the region where it is connected to said periphery, and having a finger at its end remote from said support, a rod movable within said leaf springs, a nose connected to the end of said rod outwardly of said springs, advancing-and-retracting means, connected to said rod and nose for advancing and retracting said rod and nose to advanced and retracted positions, said rod, when in the advanced position, engaging said fingers positively and flexing said leaf springs about said support in one direction from an unflexed condition to diverge said leaf springs to urge said fingers into engagement with said work pieces, and said nose, when said rod and nose are in the retracted position, engaging said fingers positively and flexing said leaf springs about said support in the opposite direction from the unflexed condition to converge said leaf springs to move said fingers out of engagement with said work, pieces, said rod including means for limiting the flexing of said leaf springs in said one direction from said unflexed condition so that the range of said flexing in said one direction is within the elastic limit of the material of said leaf springs and said nose including means for limiting said flexing of said leaf springs in said opposite direction so that the flexing of said leaf springs in said opposite direction is within the elastic limit of the material of said leaf springs.

3. The gripper apparatus of claim 2 wherein the rod has a conical cam surface near its outer end and the surfaces of the leaf springs which engage the rod, when said rod is in the advanced position, are shaped to coact as cam followers with said conical cam surface to flex the springs in the one direction to move the leaf springs in the diverging direction into engagement with the work pieces.

4. The gripper apparatus of claim 2 wherein the nose includes a stud inwardly thereof which, when the leaf springs are flexed in the opposite directions, limits the flexing of the leaf springs to a range in which the flexing of the leaf springs in the opposite direction is maintained within the elastic limit of the leaf springs.

5. Gripper apparatus for gripping work pieces, to be processed, said apparatus including hollow gripper means, said gripper means having gripper fingers and resilient means for supporting said gripper fingers, actuating means for said gripper means, cooperating with said resilient means to set said fingers in a diverged position and a converged position, said fingers engaging said work pieces in one of said positions and disengaging said work pieces in the other of said positions, advancing- and-retracting means, connected to said actuating means, for advancing said actuating means to an advanced position and for retracting said actuating means to a retracted position, said actuating means including positive diverging means, within said gripper means, to flex said resilient means in one direction from an unflexed condition of said resilient means for positively setting said fingers in said diverged position, and said acutuating means also including positive converging means, to flex said resilient means in the opposite direction from said unflexed condition of said resilient means, for setting said fingers in said converged position, said actuating means including means for limiting the flexing of said resilient means in said one direction and in said opposite direction from said unflexed condition to the elastic limit of the material of said resilient means.

6. Gripper apparatus for gripping work pieces, to be processed, said apparatus including a generally cylindrical support, a plurality of leaf spring, each leaf spring connected to the periphery of said support, and having a finger at its end remote from said support, a rod movable within said leaf springs, a nose connected to the end of said rod outwardly of said springs advancing and retracting means, connected to said rod, for advancing and retracting said rod and nose to advanced and retracted positions, said rod and nose when in the advanced position flexing said leaf springs in one direction to set said fingers in a diverged position and said nose, when said rod and nose are in the retracted position, flexing said leaf springs in the opposite direction to set said fingers in a retracted position, said fingers when in one of said positions engaging said work pieces and when in the other of said positions disengaging said work pieces, said rod including means for limiting the flexing of said leaf springs in said one direction to the elastic limit of the material of said leaf springs and said nose including means for limiting the flexing of said leaf springs in the opposite direction to said elastic limit of the material of said leaf springs.

7. Gripper apparatus for gripping work pieces to be processed, said apparatus including an annular array of leaf springs, each spring having a finger at one end thereof, a mandrel including a rod having a nose extending from its end, moving means, connected to said mandrel, for moving said mandrel, within said leaf springs between a retracted position wherein said rod is in disengagement with said fingers and said nose in engaged with said fingers and an advanced position in which said rod is in engagement with said fingers and said nose is disengaged from said fingers, said nose, by deflecting said leaf springs in one direction, setting said fingers in collapsed state in said retracted position of said rod and nose and said rod, by deflecting said leaf springs in the opposite direction, setting said fingers in an expanded state in said advanced position of said rod and nose, said nose including first limiting means to engage said leaf springs, to limit the deflection in said one direction to the elastic limit of the material of said springs and said rod including second limiting means to engage said fingers, to limit the deflection in said opposite direction to the elastic limit of said spring, said fingers when in one of said positions engaging said work and when in the other of said positions disengaging said work.

8. The gripper apparatus of claim 7 wherein the deflection limiting means included in the nose is engaged by the fingers as they are set in the position collapsed.

9. The gripper apparatus of claim 7 wherein the nose has a circularly cylindrical skirt and the nose engages the fingers along the periphery of the end of said skirt when the mandrel is in retracted position, the outside diameter of the skirt being substantially smaller than the outside diameter of the annulus formed by the leaf springs when the leaf springs are in undeflected condition, whereby when said nose is engaged with said fingers in retracted position of said mandrel, said skirt does not project beyond the external surface of said annulus.

10. Gripper apparatus for engaging and disengaging work pieces, said apparatus including a generally cylindrical support, a plurality of leaf springs, each leaf spring being connected to the periphery of said support and defining a junction with said support in the region where it is connected to said periphery, and having a finger at its end remote from said support, a rod movable within said leaf springs, a nose connected to the end of said rod outwardly of said leaf springs, advancing- and-retracting means, connected to said rod and nose for advancing and retracting said rod and nose to advanced and retracted positions, said rod, when in the advanced position, engaging said fingers positively and flexing said leaf springs about said support in one direction from an unflexed condition to diverge said leaf springs to urge said fingers into engagement with said work pieces and said nose, when said rod and nose are in the retracted position, engaging said fingers positively and flexing said leaf springs about said support in the opposite direction from the unflexed condition to converge said leaf springs to move said fingers out of engagement with said work pieces, said rod including means for limiting the flexing of said leaf springs in said one direction and said nose including a stud extending inwardly thereof to be engaged by said fingers in the retracted position of said fingers for limiting the deflection of said leaf springs in said opposite direction.

11. Gripper apparatus, for gripping work pieces to be processed, said apparatus including a generally cylindrical support, a plurality of leaf springs, each leaf spring connected to the periphery of said support, and having a finger at its end remote from said support, a rod movable within said leaf springs, a nose connected to the end of said rod outwardly of said leaf springs, advancing and retracting means, connected to said rod, for advancing and retracting said rod and nose to advanced and retracted positions, said rod and nose when in the advanced position flexing said leaf springs in one direction to set said fingers in a diverged position and said nose, when said rod and nose are in the retracted position, flexing said leaf springs in the opposite direction to set said fingers in a retracted position, said fingers when in one of said positions engaging said work pieces and when in the other of said positions disengaging said work pieces said rod including means for limiting the flexing of said leaf springs in said one direction and said nose including a stud extending internally thereof to be engaged by said fingers in the retracted position of said fingers for limiting the flexing of said leaf springs in said opposite direction.

12. The method of operating gripper apparatus for gripping work pieces, the said apparatus including fingers for engaging and disengaging said work pieces, each finger being connected through resilient means to a support, said resilient means being unstressed with the fingers in an intermediate position, said method comprising: diverging said fingers and resilient means by pivoting the resilient means to which each finger is connected by exerting positive force in one direction thus flexing the resilient means from the unstressed condition to a stressed condition in a first direction, said resilient means being flexed only over a range within the elastic limit of the material of said resilient means, and converging the fingers by pivoting the resilient means to which each finger is connected by exerting positive force in the opposite direction thus flexing the resilient means from the unstressed condition to a stressed condition in a second direction opposite to the first direction, said resilient means being flexed only over a range within the elastic limit of the material of said resilient means.

* * * * *